Feb. 12, 1952    J. P. KOSTOLNIK    2,585,017
BEARING FOR AXLE BOXES
Filed May 6, 1947
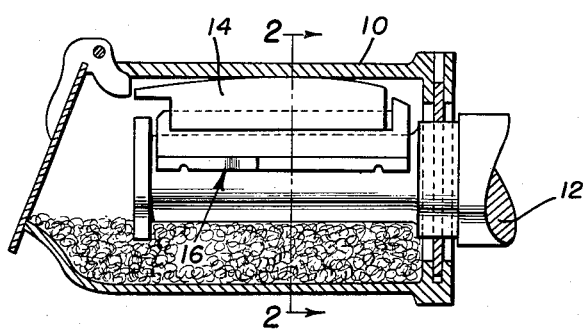
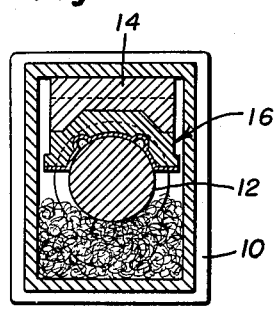
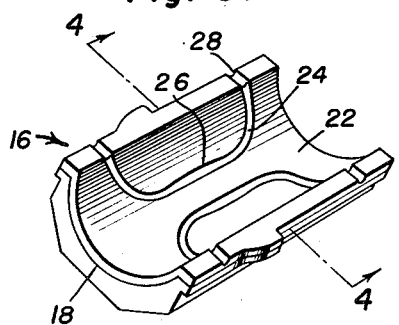
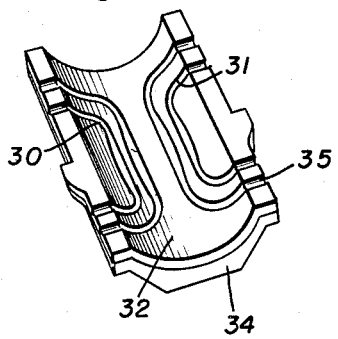
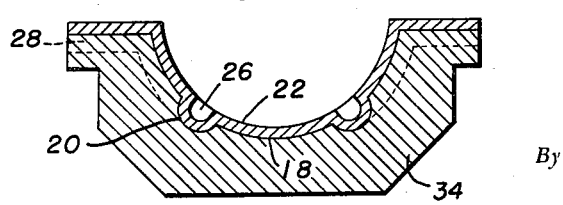
Inventor
John P. Kostolnik
By *Clarence A. O'Brien and Harvey B. Jacobson*
Attorneys Patented Feb. 12, 1952

2,585,017

UNITED STATES PATENT OFFICE 2,585,017

BEARING FOR AXLE BOXES

John P. Kostolnik, Whiting, Ind.

Application May 6, 1947, Serial No. 746,369

5 Claims. (Cl. 308—79.1)

This invention relates to new and useful improvements in bearings for axle boxes and the primary object of the present invention is to provide a bearing of the character referred to including novel oil grooves which permit distribution of the lubricant upon the wearing surfaces and prevent waste of the lubricating material.

Another important object of the present invention is to provide a bearing including oil grooves and the ends of the oil grooves being of increased width to prevent clogging of the lubricant material in the grooves.

A further object of the present invention is to provide a backing having a lining poured thereon and including novel and improved oil grooves cut in the lining.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the device applied to a journal box of a railroad car, with parts of the box broken away and shown in section;

Figure 2 is a longitudinal vertical sectional view taken on line 2—2 of Figure 1;

Figure 3 is a perspective view of the present invention;

Figure 4 is an enlarged vertical longitudinal sectional view taken on line 4—4 of Figure 3; and Figure 5 is a perspective view of the bearing in slightly modified form.

Referring now to the drawings in detail, wherein for the purpose of illustration, there is shown a preferred embodiment of the present invention, the numeral 10 represents a conventional journal box for a car axle 12.

Suitably mounted in the box is a bearing support 14 carrying the improved bearing designated generally by the numeral 16, which embraces the axle and retains lubricant material supplied to the axle.

The lower face 18 of the bearing is of concaved form and extends, as usual, on the arc of a circle. The face 18 is provided with substantially channel shaped grooves 20.

Poured on the lower face of the backing and in grooves 20, is a lining 22 of Babbitt material, this lining being cut to provide channel shaped oil grooves 24 in the same path as grooves 20. The longitudinal web portion of grooves 24 are of increased thickness to provide pockets 26, retaining oil or lubricant therein. The end portions 28 of these grooves in both the lining and the backing, are of increased width to prevent the lubricant material from clogging therein.

In forming the bearing, the backing is first provided with grooves, and then the lining is poured onto the backing. Similar grooves are cut in the lining in the path of the grooves in the backing, as the same radius is used for the backing and the lining it is evident that the central longitudinal portion of the lining will be of slightly increased thickness so that the lining is substantially crescent shaped in transverse cross section.

In practical use of the bearing, lubricating material is gathered by the axle 12 and forced into end 28 of the grooves 24. As the supply of lubricating material in these ends increases, the lubricant will rise into the grooves 24 and into the pockets 26. In this manner, the lubricating material will be retained for long periods of time in the pockets 26 and grooves 24, to supply the axle and prevent overheating of the journal box.

Figure 5 shows the bearing in slightly modified form, wherein the channel shaped grooves 30 and 31 in both the lining 32 and the backing 34 are in parallel pairs, as well as the enlarged ends 35 of these grooves.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A bearing for axles comprising a backing having U-shaped grooves, a lining fixed to said backing and in the grooves, and oil grooves cut in said lining and in the path of the grooves in the backing, said lining having side flanges and notches in said side flanges forming continuations of the oil grooves.

2. A bearing for axle boxes comprising a backing, and a lining secured to said back, said lining including side edges, said lining having a pair of substantially U-shaped oil grooves therein, each of said oil grooves including a web portion and a pair of spaced leg portions joined by said web portion, the web portions of said grooves being spaced parallel to each other and disposed longitudinally of said lining, the web portions of said grooves being of slightly increased width to form oil retaining pockets, the side edges of said lining having notches therein forming continuations of the leg portions of said grooves.

3. A bearing for axle boxes comprising a backing, and a lining secured to said backing, said lining having an inner pair of longitudinally extending grooves and an outer pair of longitudinally extending grooves, said inner longitudinally extending grooves being spaced parallel to each other and to the outer pair of longitudinally extending grooves, said lining having a plurality of transverse grooves therein intersecting said longitudinally extending grooves, each of said longitudinally extending grooves having an enlarged central portion forming an oil pocket.

4. A bearing for axle boxes comprising a backing, a lining secured to said backing, first and second substantially U-shaped grooves provided in said lining, each of said grooves having a pair of leg portions and a web portion joining the leg portions, the web portions of said grooves being spaced parallel to each other and disposed longitudinally of said lining, said lining having first and second longitudinal side edges, the leg portions of said first groove extending from the web portion of said first groove toward the first side edge of said lining and the leg portions of said second groove extending from the web portion of said second groove toward the second edge of said lining, the web portions of said grooves being of slightly increased width to form oil pockets, the side edges of said lining having notches therein forming continuations of the leg portions of said grooves.

5. A bearing for axle boxes comprising a backing, a lining secured to said backing, first and second inner substantially U-shaped grooves provided in said lining, each of said inner grooves having a pair of leg portions and a web portion joining the leg portions, the web portions of said inner grooves being spaced parallel to each other and disposed longitudinally of said lining, said lining having first and second longitudinal side edges, the leg portions of said first inner groove extending from the web portions of said first inner groove toward the first side edge of said lining and the leg portions of said second groove extending from the web portion of said second groove toward the second edge of said lining, the web portions of said inner grooves being of slightly increased width to form oil pockets, said lining having first and second outer substantially U-shaped grooves, each of said outer grooves having a web portion and a pair of leg portions joined by said web portion, the web portion of said first outer groove being spaced parallel to the web portion of said first inner groove and the leg portions of said first outer groove being spaced parallel to the leg portions of said first inner groove, the web portion of said second outer groove being spaced parallel to the web portion of said second inner groove and the leg portions of said second outer groove being spaced parallel to the leg portions of said second inner groove, the web portions of said outer grooves having central portions of slightly increased width to form oil retaining pockets, the side edges of said lining having notches therein forming continuations of the leg portions of said inner and outer grooves.

JOHN P. KOSTOLNIK.

REFERENCES CITED

The following references are of record in the file of this patent:

UNITED STATES PATENTS

| Number | Name | Date |
| --- | --- | --- |
| 390,590 | Griswold | Oct. 2, 1888 |
| 649,302 | Hardy | May 8, 1900 |
| 652,026 | Jacquemin | June 19, 1900 |
| 1,675,641 | Christman | July 3, 1928 |
| 1,908,122 | Crawford | May 9, 1933 |
| 2,025,632 | Barks | Dec. 24, 1935 |
| 2,044,514 | Tatum | June 16, 1936 |
| 2,087,858 | Hirsch | July 20, 1937 |